(12) United States Patent
Moon

(10) Patent No.: US 6,771,980 B2
(45) Date of Patent: Aug. 3, 2004

(54) METHOD FOR DIALING IN A SMART PHONE

(75) Inventor: Jeong-Kyu Moon, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 528 days.

(21) Appl. No.: 09/728,814

(22) Filed: Dec. 1, 2000

(65) Prior Publication Data

US 2001/0002926 A1 Jun. 7, 2001

(30) Foreign Application Priority Data

Dec. 2, 1999 (KR) .......................................... 1999-54380

(51) Int. Cl.[7] ................................................. H04B 1/38
(52) U.S. Cl. ................ 455/553.1; 455/90.1; 455/556.2; 345/173
(58) Field of Search ................................ 455/90, 556.2, 455/575, 418, 566, 403, 550, 553.1, 66, 556.1, 457, 552.1, 90.1, 90.2, 90.3; 379/93.1, 93.05, 93.2; 345/32, 173

(56) References Cited

U.S. PATENT DOCUMENTS

| | | | | |
|---|---|---|---|---|
| 5,572,573 A | * | 11/1996 | Sylvan et al. ............ 455/556.2 |
| 5,625,673 A | * | 4/1997 | Grewe et al. ............ 455/556.2 |
| 5,797,089 A | * | 8/1998 | Nguyen ....................... 455/403 |
| 5,826,198 A | * | 10/1998 | Bergins et al. ............. 455/557 |
| 6,415,138 B2 | * | 7/2002 | Sirola et al. ................ 455/90.1 |
| 6,418,309 B1 | * | 7/2002 | Moon et al. ................ 455/418 |
| 6,453,173 B1 | * | 9/2002 | Reber et al. ................ 455/557 |
| 6,487,396 B1 | * | 11/2002 | Sassi ......................... 455/90.1 |

* cited by examiner

Primary Examiner—Nick Corsaro
Assistant Examiner—Tan Trinh
(74) Attorney, Agent, or Firm—Dilworth & Barrese, LLP.

(57) ABSTRACT

A method for dialing a phone number in a smart phone having both PDA (Personal Digital Assistant) and mobile phone functions during operation of a PDA function, comprising the steps of loading the OS (Operating System) program for dialing the phone number during operation of the PDA function, selecting a phone number, displaying a dialing icon according to an embodiment of the received signal strength indicator (RSSI), and dialing the selected phone number by selecting the dialing icon in response to the user's request of dialing.

13 Claims, 4 Drawing Sheets

METHOD FOR DIALING IN A SMART PHONE

BACKGROUND OF THE INVENTION

1. Field of the Invention

The present invention relates to a combination of a personal digital assistant (PDA) and a mobile phone, the combination of which is hereinafter referred to as a "smart phone", and more particularly to a method for dialing in such a smart phone during the execution of a program for the PDA function.

2. Description of the Related Art

When the smart phone is performing a PDA function to process data, and the user wishes to make a phone call by dialing a phone number displayed on a display of the smart phone, the user must first memorize or record the number, terminate the current PDA function, and then execute the dialing program to dial the phone number. This wastes time and can result in the loss of the phone number if the user forgets the phone number or part thereof between the time the user memorizes it and the time it is dialed.

SUMMARY OF THE INVENTION

It is an object of the present invention to provide a method for readily dialing a selected phone number in a smart phone during the performance of a PDA function.

It is another object of the present invention to provide a method for readily registering a phone number in an electronic phone book of a smart phone during the performance of a PDA function.

According to an aspect of the present invention, a method for dialing a selected phone number in a smart phone, having both PDA (Personal Digital Assistant) and mobile phone functions, during the performance of a PDA function, comprises the steps of loading an OS (Operating System) program for dialing the phone number during the performance of the PDA function, displaying a dialing icon according to a received signal strength indicator (RSSI), and dialing the selected phone number by selecting a dialing icon in response to the dialing request of the user.

BRIEF DESCRIPTION OF THE ATTACHED DRAWINGS

DETAILED DESCRIPTION OF THE PREFERRED EMBODIMENT

A preferred embodiment of the present invention will be described in detail herein below with reference to the accompanying drawings. In the following description, numerous specific details are set forth to provide a more thorough understanding of the present invention. It will be apparent, however, to one skilled in the art that the present invention may be practiced without these specific details. In other instances, well known functions or constructions have not been described so as not to obscure the present invention.

Figure 1:
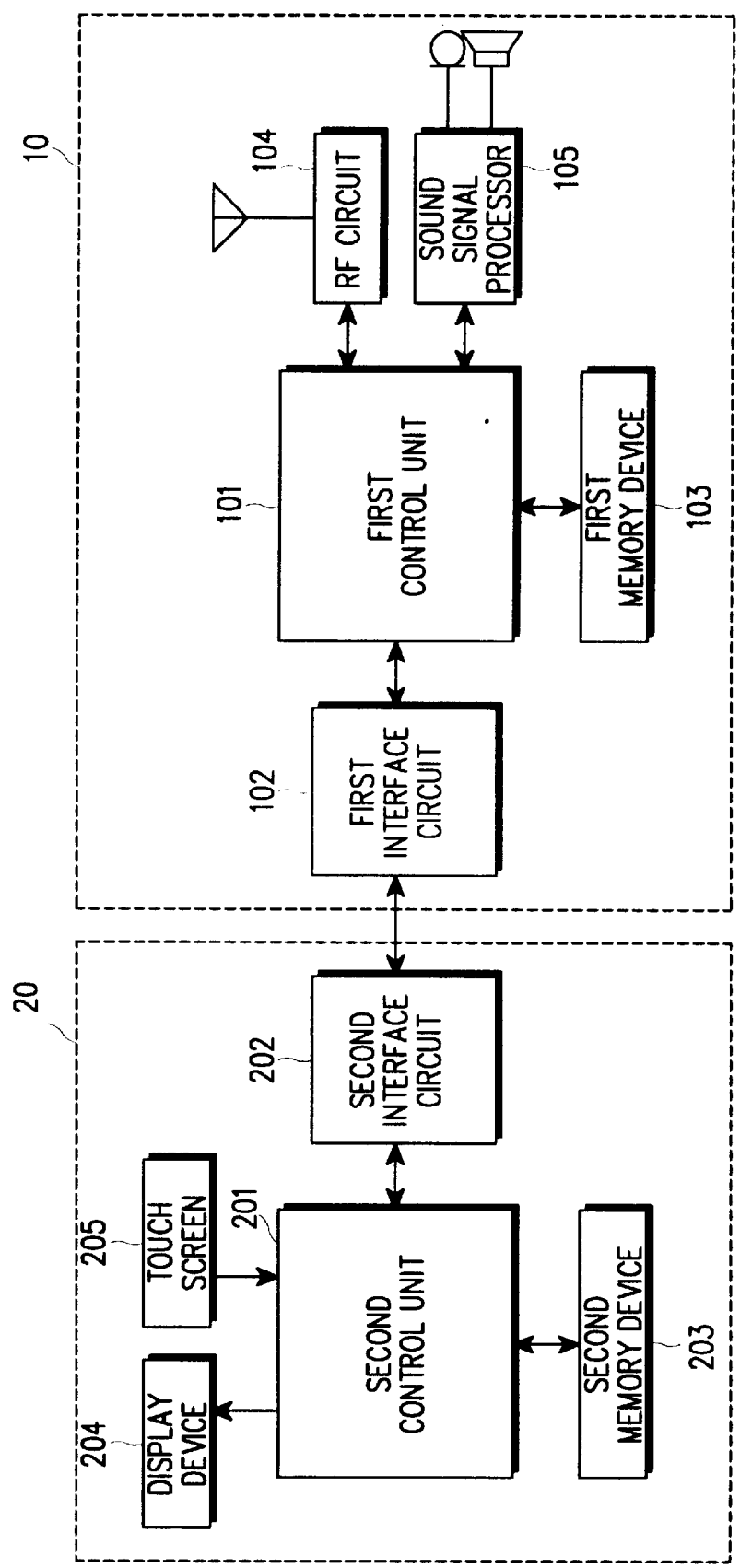
FIG. 1 is a block diagram illustrating the structure of a smart phone having both PDA and mobile phone functions according to an embodiment of the present invention.
Figure 2:
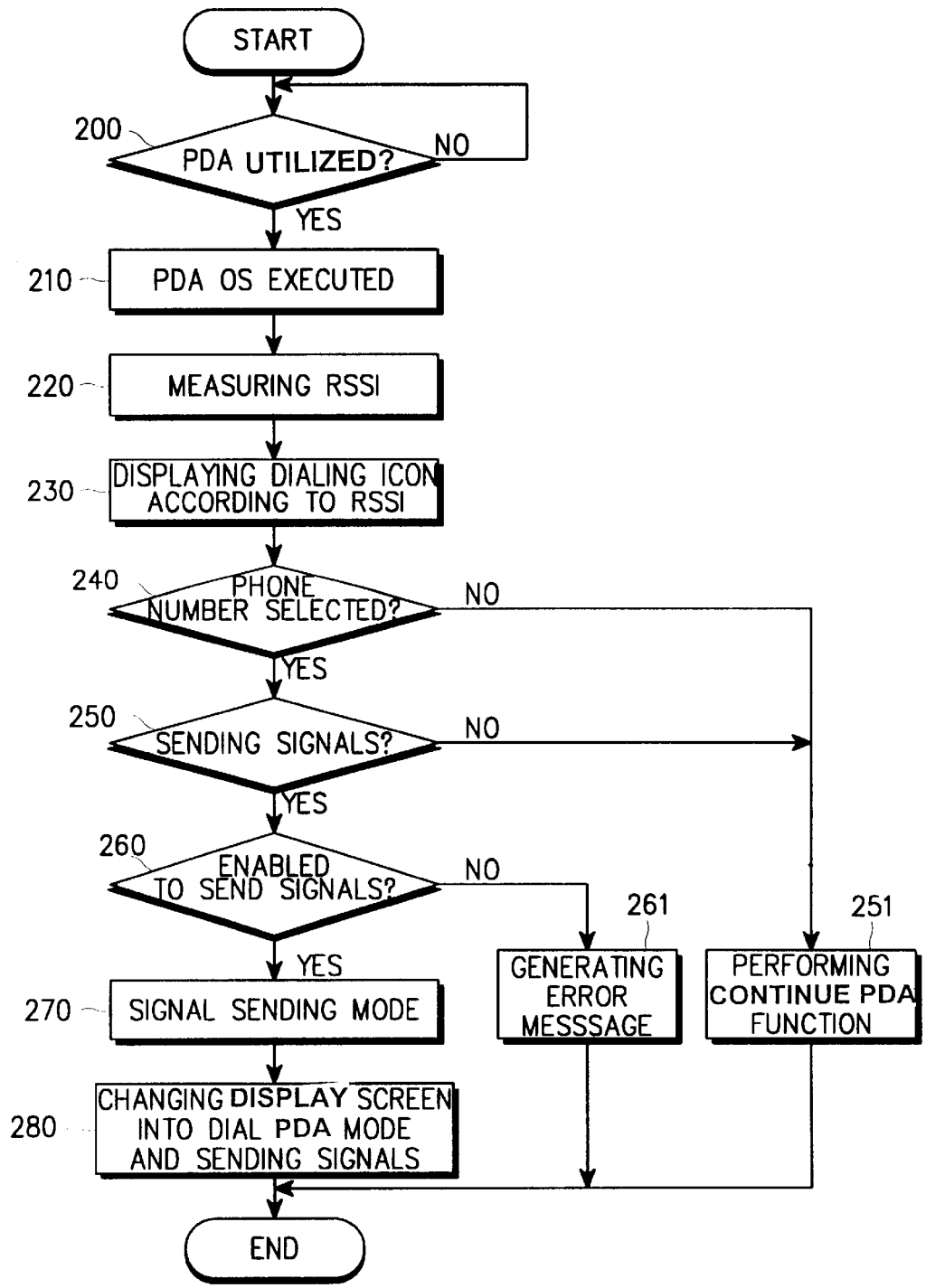
FIG. 2 is a flow chart illustrating the steps of dialing a selected phone number in a smart phone according to an embodiment of the present invention.

Referring to FIG. 1, a smart phone consists of a mobile phone section 10 and a PDA section 20. The mobile phone section 10 includes a first control unit 101, first interface circuit 102, first memory device 103, RF circuit 104, and sound signal processor 105. In addition, the PDA section 20 comprises a second control unit 201, second interface circuit 202, second memory device 203, display device 204, and touch screen 205.

The first control unit 101 of the mobile phone section 10 controls all of the mobile phone functions such as sending and receiving signals. The first interface circuit 102 interfaces the first control unit with the PDA section 20. The first memory device 103 stores a plurality of programs for performing the mobile phone functions, and comprises RAM (Random Access Memory), ROM (Read Only Memory), etc. The sound signal processor 105 decodes the signals received through an antenna into the corresponding sound signals applied to a speaker, and encodes the sound signals received through a microphone into the corresponding digital signals. The RF circuit 104 modulates the digital signals with the baseband, amplifies, up-converts, and transmits them through the antenna, while demodulating the signals received through the antenna into the corresponding digital signals through down-conversion and amplifying.

The second control unit 201 of the PDA section 20 controls all of the PDA functions, enabling the smart phone to send a signal during the performance of the PDA function. The second memory device 203 stores a plurality of programs for performing the PDA functions, including RAM, ROM, etc. The RAM is used to load the OS (Operating System) program for driving the PDA section 20, and to load the program for editing and dialing a phone number according to an embodiment of the present invention. The display device 204 displays graphic data including various data produced during operation of the PDA and mobile phone functions. It also displays the icon for editing and dialing a phone number. The touch screen 205 is used to enter data. The use of a touch screen is not meant to be exclusive and may be replaced by a conventional keypad along with a conventional mouse, or other similar configuration.

Figure 3:
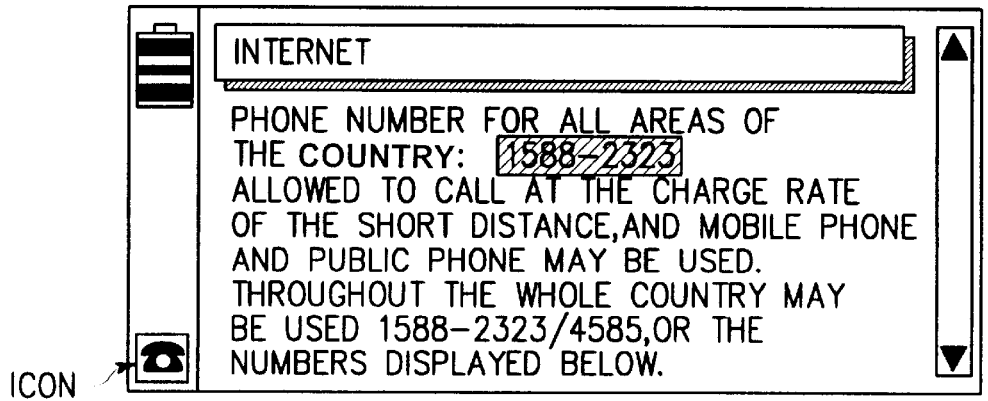
FIG. 3 is a diagrammatic representation of a display screen of a smart phone displaying phone numbers for selection during the performance of the PDA function according to an embodiment of the present invention.

The operation of the preferred embodiment of the present invention will now be described with reference to FIGS. 1 to 4. First, referring to FIG. 2, if the user enters the start data through the touch screen in step 200, the second control unit 201 executes the OS program for operating the PDA section 20 in step 210. Then, the first control unit 101 of the mobile phone section measures in step 220 the RSSI of the signals received through the antenna and displays the dialing icon in step 230 as shown in FIG. 3. The dialing icon is displayed if the RSSI is equal to or greater than a predetermined value. The displaying of the dialing icon depends on the periodically measured RSSI during operation of the PDA function.

If no phone number is selected the process continues to step 251 to continue performing the PDA function. If the user selects a phone number displayed on the display device 204 during the performance of the PDA function in step 240 (refer to FIG. 3), and selects the dialing icon in step 250, the process displays a phone editor and goes to step 260 to determine if the phone can transmit the phone signals. The phone editor allows the user to edit the phone number prior to dialing. If the signals cannot be transmitted the process continues to step 261, where an error message is displayed.

If the smart phone can transmit signals, it enters a signal sending mode 270. Of course, if the user does not select the dialing icon in step 250, the process goes to step 251 continue performing the PDA function. The selection of the phone number may be achieved by pressing a pen of a touch screen or by the dragging of a mouse.

Figure 4:
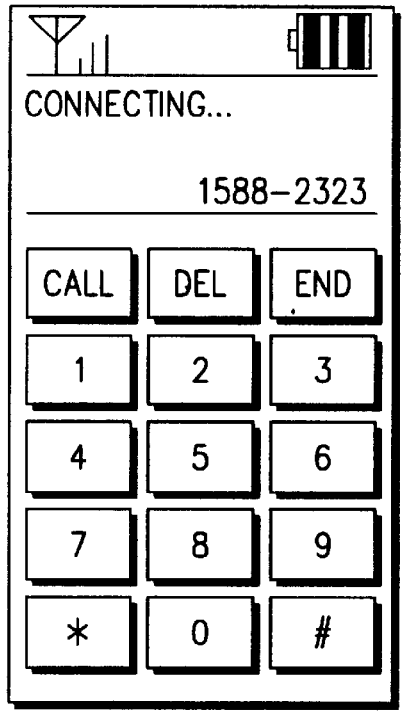
FIG. 4 is a diagrammatic representation of the display screen of a smart phone displaying a key matrix for dialing according to an embodiment of the present invention.

In step 270, the second control unit 201 of the PDA section 20 sends a signal through the mobile phone section 10 to dial the selected phone number. Then in step 280 it changes the display screen into the dial pad mode, as shown in FIG. 4, by clearing any images presently displayed. Summarizing the present embodiment, when the user utilizes the PDA section 20, the smart phone loads the OS program to enable it to send a signal along with displaying the dialing icon, so that a phone number selected by the user during operation of the PDA function may be dialed by selecting the dialing icon.

Describing another embodiment of the present invention in connection with FIGS. 1 and 3 to 5, a dialing operation is accomplished by a phone program for editing and dialing a phone number loaded in the RAM during the performance of the PDA function without employing the OS program supporting the dialing operation as in the previous embodiment.

Figure 5:
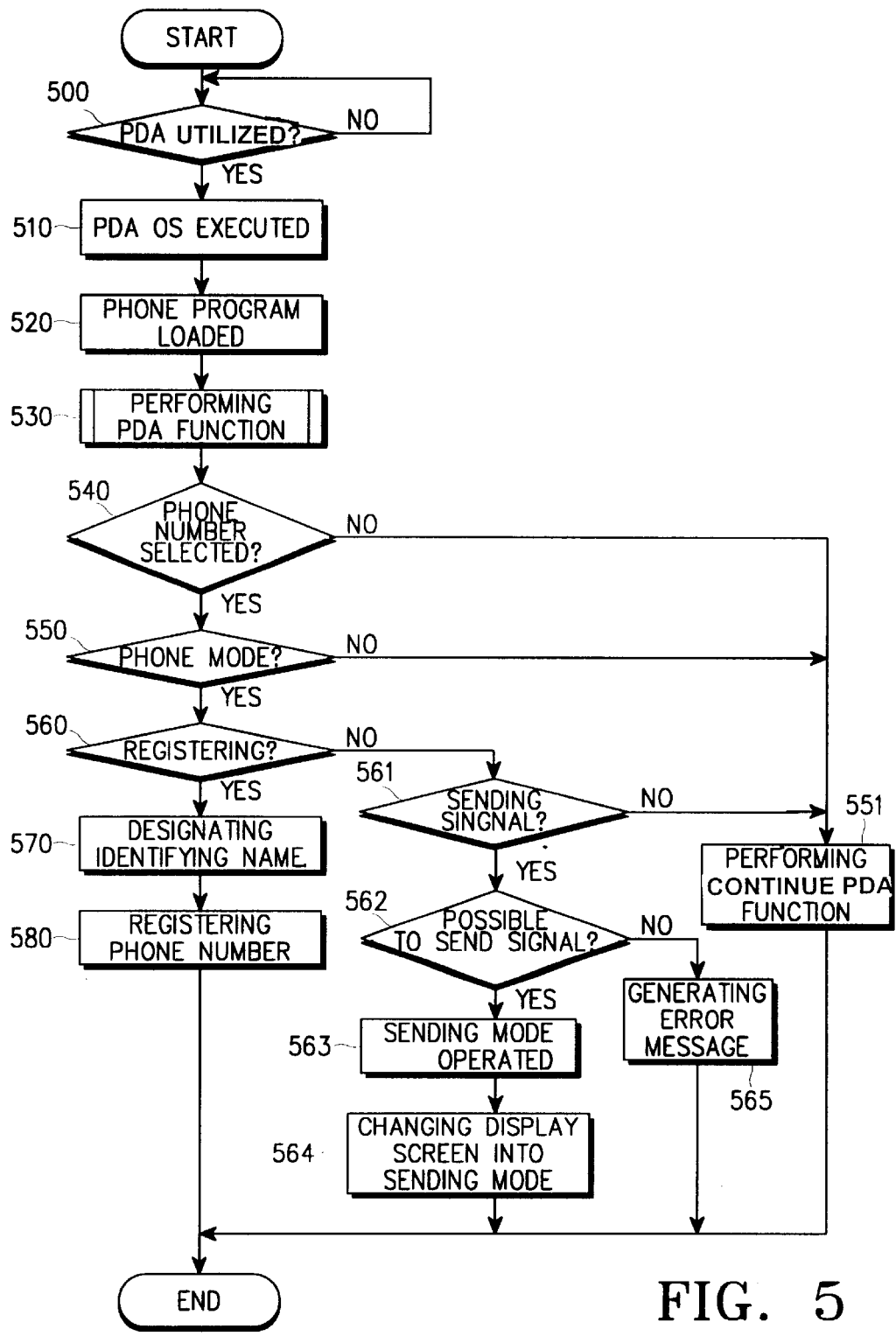
FIG. 5 is a flow chart illustrating the steps of registering a phone number selected for dialing in a phone book of a smart phone according to another embodiment of the present invention.

Referring to FIG. 5, if the PDA section 20 is utilized in step 500, the OS system is executed in step 510, and the phone program is loaded in step 520 so that the telephone icon is displayed on the display device 204 as shown in FIG. 3. In step 530, the second control unit 201 of the PDA section 20 performs a PDA function, for example, playing a game or editing a document. If no phone number is selected in step 540, the process continues to step 551 to continue performing the PDA function. Meanwhile, if the user selects a phone number at step 540, the process goes to step 550 to determine whether the telephone icon is selected or not. If the telephone icon is not selected the process continues to step 551 to continue performing the PDA function. If the telephone icon is selected, the PDA function is terminated to execute the phone program. The phone program determines in step 560 whether there is a request to register the selected phone number. If so, the process goes to step 570 to register the phone number in a phone book of the first memory 103 of the mobile phone section 10 or the second memory 203 of the PDA section 20 by designating a suitable address together with an identifying name. In step 570 a name is designated and registering or storing the name and phone number in memory at step 580 ends the process. If there is no request to register the number at step 560, the process goes to step 561 to determine if the selected phone number is dialed. If the selected phone number is not dialed in step 561, the process continues to step 551 to continue performing the PDA function. If so, the process goes to step 562 to determine whether the smart phone is enabled to send a signal. This is accomplished by measuring the RSSI and determining whether the smart phone is in the state of sending or receiving signals. If the phone can send the signal, i.e. the signal is strong enough and the smart phone is neither receiving or sending signals, the process goes to step 563 to send a signal corresponding to the phone number, and then to step 564 to change the display screen into the sending mode, as shown in FIG. 4, after terminating the PDA function. However, if the signal cannot be sent at step 562, an error message is displayed on the display device 204 at step 565.

Summarizing the operation of the second embodiment, when the PDA section 20 is utilized, the phone program for editing and dialing a phone number is loaded in the RAM, and the telephone icon is displayed on the display screen of the display device 204. Then, if the user selects a phone number and selects the telephone icon during operation of the PDA function, the control unit executes the phone program to register the selected phone number into the phone book and/or send a signal corresponding thereto after terminating the PDA function.

While the present invention has been described in connection with specific embodiments accompanied by the attached drawings, it will be readily apparent to those skilled in the art that various changes and modifications may be made thereto without departing from the scope and spirit of the present invention as defined by the appended claims.

What is claimed is:

1. A method for dialing a phone number in a smart phone having both PDA (Personal Digital Assistant) and mobile phone functions during operation of the PDA function, comprising the steps of:

loading an OS (Operating System) program for dialing the phone number during operation of the PDA function;

displaying a dialing icon if a received signal strength indicator (RSSI) is equal to or greater than a predetermined value; and dialing said phone number by selecting said dialing icon.

2. The method as defined in claim 1, wherein said dialing step further comprises the steps of:

comparing said RSSI with the predetermined value;

determining whether said smart phone is sending or receiving signals if said RSSI is equal to or greater than said predetermined value; and switching a display screen into a dialing state by performing a dialing routine.

3. The method as defined in claim 2, further including the step of displaying an error message if one of said RSSI is below said predetermined value and said smart phone is sending or receiving signals.

4. The method as defined in claim 1, wherein said phone number is selected by one of pressing a touch screen and dragging a mouse.

5. A method for dialing a phone number in a smart phone having random access memory (RAM) and both personal digital assistant (PDA) and mobile phone functions during operation of a PDA function, comprising the steps of:

loading an operating system (OS) program for said PDA function;

loading a phone program for editing and dialing a phone number along with displaying a phone editor and dialing icon if said PDA function is requested by a user;

executing said phone program if said user selects a phone number during operation of said PDA function;

storing an identifying name designated for the selected phone number into a phone book; and dialing the selected phone number.

6. The method as defined in claim 5, wherein said dialing step further comprises the steps of:

checking a received signal strength indicator (RSSI) with a predetermined value;

determining whether said smart phone is sending or receiving signals if said RSSI is equal to or greater than said predetermined value; and switching a display screen into a dialing state by performing a dialing routine.

7. The method as defined in claim 6, further including the step of displaying an error message if one of said RSSI is below said predetermined value and said smart phone is sending or receiving signals.

8. The method as defined in claim 6, wherein said phone editor and dialing icon are shaped like a telephone.

9. The method as defined in claim 5, wherein said phone number is selected by one of pressing a touch screen and dragging a mouse.

10. A method for dialing a phone number in a smart phone having both personal digital assistant (PDA) and mobile phone functions, comprising the steps of:
  executing a dialing program for editing and dialing a phone number and displaying a phone editor and a dialing icon when a PDA function is utilized in said smart phone;
  switching a display screen into a dialing state for selecting a phone number when said dialing icon is selected during the performance of said PDA function;
  storing an identifying name designated for the selected phone number into a phone book; and
  dialing the selected phone number.

11. The method as defined in claim 10, wherein said display screen is switched into the dialing state provided a received signal strength indicator (RSSI) is equal to or greater than a predetermined value and said smart phone is not sending or receiving signals.

12. The method as defined in claim 11, further including the step of displaying an error message if one of said RSSI is below said predetermined value and said smart phone is sending or receiving signals.

13. The method as defined in claim 10, wherein said selected phone number is selected by one of pressing a touch screen and dragging a mouse.

* * * * *